US006333849B1

(12) United States Patent
Donahoe et al.

(10) Patent No.: US 6,333,849 B1
(45) Date of Patent: Dec. 25, 2001

(54) APPARATUS FOR LIQUID COOLING OF SPECIFIC COMPUTER COMPONENTS

(75) Inventors: Daniel N. Donahoe; Michael T. Gill, both of Spring, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/024,205

(22) Filed: Feb. 17, 1998

Related U.S. Application Data

(60) Division of application No. 08/775,143, filed on Dec. 31, 1996, which is a continuation-in-part of application No. 08/674,018, filed on Jul. 1, 1996, now Pat. No. 5,757,615.

(51) Int. Cl.$^7$ ................................ G06F 1/20; H05K 7/20
(52) U.S. Cl. .................................. 361/687; 361/699
(58) Field of Search .................................. 361/699, 687, 361/685, 689, 698, 825; 165/80.3, 80.4, 80.5; 174/15.1; 454/184

(56) References Cited

U.S. PATENT DOCUMENTS

| 3,462,553 | 8/1969 | Spranger | 179/1 |
|---|---|---|---|
| 3,698,182 | 10/1972 | Knöös . | |
| 3,857,044 | 12/1974 | Papoi et al. | 307/9 |
| 3,934,177 | 1/1976 | Horbach | 317/100 |
| 3,940,665 | 2/1976 | Seki | 317/100 |
| 3,946,276 | 3/1976 | Braun et al. | 317/100 |
| 4,072,188 | 2/1978 | Wilson et al. | 165/80 |
| 4,093,971 | 6/1978 | Chu et al. | 361/382 |
| 4,115,836 | 9/1978 | Hutchison et al. | 361/382 |
| 4,434,625 | 3/1984 | Cree | 62/199 |
| 4,471,407 | 9/1984 | Sleder | 361/387 |
| 4,528,615 | 7/1985 | Perry | 361/386 |
| 4,590,538 | 5/1986 | Cray, Jr. | 361/385 |
| 4,631,573 | 12/1986 | Sutrina | 357/82 |
| 4,639,834 | 1/1987 | Mayer | 361/388 |
| 4,704,658 | 11/1987 | Yokouchi et al. | 361/385 |
| 4,710,851 | 12/1987 | Pastecki | 361/384 |

(List continued on next page.)

FOREIGN PATENT DOCUMENTS

| 2052164A | 1/1981 | (GB) | 361/383 |
|---|---|---|---|
| 56-152254 (A) | 11/1981 | (JP) . | |

OTHER PUBLICATIONS

Wakefield Engineering 1996 Catalog © 1995 Wakefield Engineering (entire catalog) entitled "Innovative Thermal Management Solutions".
EG&G Wakefield Engineering, Series 180–10, 180–11, 135.
EG&G Wakefield Engineering brochure entitled "Heat Dissipation Components for Semiconductors, Computers, and Power Supplies" (3 pages).
"Module Packaging Options", p. 17 & 18.

(List continued on next page.)

Primary Examiner—Lynn D. Feild
(74) Attorney, Agent, or Firm—Akin, Gump, Strauss, Hauer & Feld, LLP (57) ABSTRACT

Apparatus is provided for a heat transfer assembly for direct attachment to a high heat generating chip, which assembly includes a pump, air side heat exchanger mounted adjacent to a fan and a heat transfer plate which is attached to the high heat generating component for dissipating heat from such component under operating conditions. In another embodiment, apparatus is provided for dissipating heat from a hard disk drive including a U-shaped heat exchange clip resiliently mounted on opposite surfaces of a hard disk drive. In another embodiment, apparatus for dissipating heat from a hard disk drive includes a generally rectangular plate for mounting on the top or bottom of the hard disk drive. And, in another embodiment, apparatus is provided transferring heat from a vertical array of hard disk drives, which apparatus includes one or more panels interposed between adjacent vertically disposed hard disk drives.

31 Claims, 6 Drawing Sheets

U.S. PATENT DOCUMENTS

| | | | |
|---|---|---|---|
| 4,729,061 | 3/1988 | Brown | 361/386 |
| 4,748,495 | 5/1988 | Kucharek | 357/82 |
| 4,751,872 | 6/1988 | Lawson, Jr. | 98/1 |
| 4,758,926 | 7/1988 | Herrell et al. | 361/385 |
| 4,772,980 | 9/1988 | Curtis et al. | 361/90 |
| 4,806,833 | 2/1989 | Young | 318/335 |
| 4,870,477 | 9/1989 | Nakanishi et al. | 357/82 |
| 4,872,102 | 10/1989 | Getter | 363/141 |
| 4,879,632 | 11/1989 | Yamamoto et al. | 361/386 |
| 4,956,531 | 9/1990 | Braunisch et al. | 219/10.55 B |
| 4,964,737 | 10/1990 | Baker et al. | 374/179 |
| 4,997,032 | 3/1991 | Danielson et al. | 165/46 |
| 5,012,325 | 4/1991 | Mansuria et al. | 357/81 |
| 5,031,072 | 7/1991 | Malhi et al. | 361/387 |
| 5,060,114 | 10/1991 | Feinberg et al. | 361/387 |
| 5,070,701 | 12/1991 | Saeki et al | 62/3.1 |
| 5,097,670 | 3/1992 | Yoshikawa et al. | 62/99 |
| 5,099,908 | 3/1992 | Taraci et al. | 165/1 |
| 5,115,225 | 5/1992 | Dao et al. | 340/584 |
| 5,123,478 | 6/1992 | Hosaka | 165/35 |
| 5,131,859 | 7/1992 | Bowen et al. | 439/194 |
| 5,142,442 | 8/1992 | Daniels et al. | 361/384 |
| 5,144,532 | 9/1992 | Wessely et al. | 361/385 |
| 5,159,529 | 10/1992 | Lovgren et al. | 361/385 |
| 5,168,919 | 12/1992 | Berenholz et al. | 165/80.4 |
| 5,171,183 * | 12/1992 | Pollard et al. | 361/685 |
| 5,174,364 | 12/1992 | Mizuno | 165/13 |
| 5,181,167 | 1/1993 | Davidson et al. | 361/385 |
| 5,185,691 | 2/1993 | Korinsky | 361/386 |
| 5,190,099 | 3/1993 | Mon | 165/104.33 |
| 5,199,487 | 4/1993 | DiFrancesco et al. | 165/168 |
| 5,226,471 | 7/1993 | Stefani | 165/13 |
| 5,258,888 | 11/1993 | Korinsky | 361/704 |
| 5,260,850 | 11/1993 | Sherwood et al. | 361/689 |
| 5,285,108 | 2/1994 | Hastings et al. | 257/712 |
| 5,285,347 | 2/1994 | Fox et al. | 361/687 |
| 5,297,400 | 3/1994 | Benton et al. | |
| 5,394,936 | 3/1995 | Budelman | 165/104 |
| 5,457,603 * | 10/1995 | Leeb | 361/699 |
| 5,511,306 | 4/1996 | Denton et al. | 29/840 |
| 5,808,871 * | 9/1998 | Rosecan et al. | 361/685 |
| 5,818,692 * | 10/1998 | Denney et al. | 361/699 |
| 5,826,547 * | 10/1998 | Francovich et al. | 361/685 |
| 5,927,386 * | 7/1999 | Lin | 361/685 |

OTHER PUBLICATIONS

Electronic Design/Nov. 4, 1996, pp. 183–184 "Diagnostic IC Opens Door to Remote CPU Health Checks".

COMPAQ SYSTEMPRO brochure, 5 pages.

Intel 1995 publication entitled "Pentium™ Processors and Related Products", pp. 2–645 and 2–646.

Intel 1995 publication entitled "Packaging Databook", pp. 4–36 & 4–37.

Components, Packaging, and Manufacturing Technology Society Newsletter, vol. 19, No. 3, Sep., 1996 (3 pages).

Solenoid (electricity) pp. 610 and 611 of McGraw–Hill Encyclopedia of Science & Technology, 5th Edition ©1982 McGraw–Hill, Inc.

"Analytic Solutions for Flow in Tubes", p. 103 from Kays & London.

Board Level Heat Sinks for TO–220 and TO–218 Components, Wakefield Engineering publication.

Penguin™ Coolers: Heat sinks for Microprocessors and ASICs, 4 pages, Wakefield Engineering publication.

"Board Level Heat Sinks", 8 pages, Wakefield Engineering publication.

Compaq Confidential document entitled "Xolox Fluid Products I.C. Cooling System for Compaq Computer Corporation."

"Liquid–Cooled PC's: The Next Hot Thing?", 4465 yte; No. 2, Peterborough, NH, Feb. 19, 1994.

U.S. application No. 08/034,095, Thome, filed Mar. 22, 1993.

Compaq Confidential document entitled "Xolox Fluid Products I.C. Cooling System for Compaq Computer Corporation".

* cited by examiner

APPARATUS FOR LIQUID COOLING OF SPECIFIC COMPUTER COMPONENTS

CROSS-REFERENCE TO RELATED APPLICATIONS

This invention is a Divisional of Ser. No. 08/755,143 filed Dec. 31, 1996 and also a continuation-in-part of U.S. patent application Ser. No. 08/674,018 filed Jul. 1, 1996 now U.S. Pat. No. 5,757,615 and entitled Liquid Cooled Computer Apparatus and Associated Methods, listing as inventors Daniel N. Donahoe and Michael T. Gill, and assigned to Compaq Computer Corporation.

BACKGROUND OF THE INVENTION

The present invention relates to apparatus for liquid cooling by conduction of specific computer components mounted within a housing for a computer in order to reduce the operating temperature of such components.

As certain components for computers, such as microprocessors or hard disk drives become more powerful and complex, while maintaining compact size, more effective thermal management becomes necessary in order to maintain desirable operating temperatures. It is well known that according to the Arrhenius equation, there is an exponential increase in failure rates with incremental increases in operating temperatures. For example, assuming a 1.0 eV activation energy, the failure rate doubles for every 10° rise in operating temperature. Therefore, increases in power of computer chips such as the Pentium® requires more effective heat management techniques to prevent undesirable rises in operating temperatures.

It is known to apply air-cooled fin modules directly to electronic components in order to dissipate heat through conduction by use of finned heat exchangers and convection with such heat exchangers being cooled by air flow. For example, Intel's 486 microprocessor was cooled by a conformal finned heat exchanger, and Intel's Pentium® chip has been cooled by finned type heat exchangers which have surface area extending beyond the actual contact surface area of the Pentium®, sometimes known as extended surface heat exchangers. The operating power of certain components such as newer versions of Pentium® chips of Intel has reached levels which require high volumes of forced ambient air to dissipate generated heat; however, forced air to cool finned modules have limitations in that there may be an upper limit to volumetric flow of cooling air due to noise or other factors such as increased power requirements.

Cooling systems other that finned surface area exchangers are currently known in the prior art. For examples Peltier coolers and heat pipes are known. But, the potential height of Peltier coolers as well as the requirement for extra cooling load due to inherent inefficiencies reduce the probability for successful application to high heat load components. And, heat pipes have heat transfer capacity limitations due primarily to losses in realizing connection to hot and cold thermodynamic reservoirs, but also due to limitations of heat transport due to internal design limits.

It is also known to use cooling plates for circulating liquid coolant, which plates are mounted in contact with various power modules such as transistors, diodes and rectifiers. For example, the EG&G Components Division of Wakefield Engineering of Walefield, Mass. manufactures sheet plates which are bent to conform, that is, crimped about cooling tubes and water-cooled solid copper blocks designed to cool pressure mounted rectifiers and SCR's dissipating up to 2 low per device. The Walkefield cooled plates have several disadvantages in that there is significant thermal resistance across the interface between the copper tube and the aluminum plate, and in that crimping of tubes. in such a manner haves been found to lead to variations in cooling of up to 50 per cent.

A number of prior art patents are directed to the use of liquid coolant to cool electronic components, particularly in large main frame type computers. U.S. Pat. No. 5,159,529 utilizes a plastic internal cooling core having mounted to it one or more cooling plates of copper to receive various electronic components. However, the attachment of cooling plates of copper to a plastic core may cause possible leak problems due to material incompatibility. U.S. Pat. No. 5,144,532 discloses the use of two oppositely positioned liquid cooling plates which are in contact with printed circuits positioned on opposite sides of a multi-layer printed circuit board. U.S. Pat. No. 4,748,495 discloses a liquid cooling module for a plurality of integrated circuit chips arrayed in uneven height wherein cooling fluid is routed either through a group of heat sinks or independently through each of a number of heat sinks. And, U.S. Pat. No. 4,758,926 discloses utilizing heat sinks having microchannels to receive cooling fluid for cooling chips.

While the prior art encompasses the general use of cooling fluid or coolant to cool electronic components, there remains a need to develop a high capacity cooling system for mounting within computer housings for desktop and server size computers where the cooling system is in direct contact with the most powerful and highest heat generating electronic components, such as more recent and more powerful versions of the Pentium processor and hard disk drives. It is accordingly an object of this invention to provide a cooling system specifically directed to such components.

SUMMARY OF THE INVENTION

In accordance with various embodiments of this invention, apparatus is provided for transferring heat from high heat generating electronic components such as advanced, high powered computer chips and hard disk drives. In one embodiment, such apparatus includes a generally rectangular chassis having a plurality of components including a mother board, with a processor chip being mounted in one of the processor slots on the mother board. A heat exchange assembly includes a power supply mounted in one corner of the chassis having a fan mounted adjacent to the power supply. The heat exchange assembly is provided for dissipating heat generated by the chip including an air to liquid heat exchanger mounted on the chassis adjacent to the fan, a pump mounted on the chassis at a convenient point and a heat transfer plate having a configuration substantially identical to the bottom surface of the high heat generating chip. The heat transfer plate is connected to the air side heat exchanger and pump by suitable tubing lines so that a liquid coolant can be transferred to the heat transfer plate in order to remove heat from the high heat generating chip, with the heated coolant being cooled in the air side heat exchanger and returned by the pump to the heat transfer plate in a continuous fashion.

In another embodiment of this invention, apparatus is provided for cooling an operating hard disk drive, including a generally U-shaped heat exchange dip for resilient mounting onto the sides of the hard disk drive container. The U-shaped clip has external liquid coolant flow loops attached on the outside of the dip in order to transfer heat from the hard disk drive. In another embodiment of cooling for an individual hard disk drive, apparatus includes a generally rectangular heat transfer plate having substantially the same dimensions as a surface of a hard disk drive container for transferring heat from such container.

And, further apparatus is provided for transferring heat from a vertical array or stack of hard disk drive units. Such apparatus includes one or more panels mounted between adjacent, vertically positioned hard disk drive units in order to remove heat from adjacent units simultaneously.

This summary of the invention is intended as a general description of the attributes of this invention, which will now be described in more detail in the detailed description, with the claims to follow setting forth the subject matter sought to be patented.

DETAILED DESCRIPTION OF INVENTION

Figure 1:
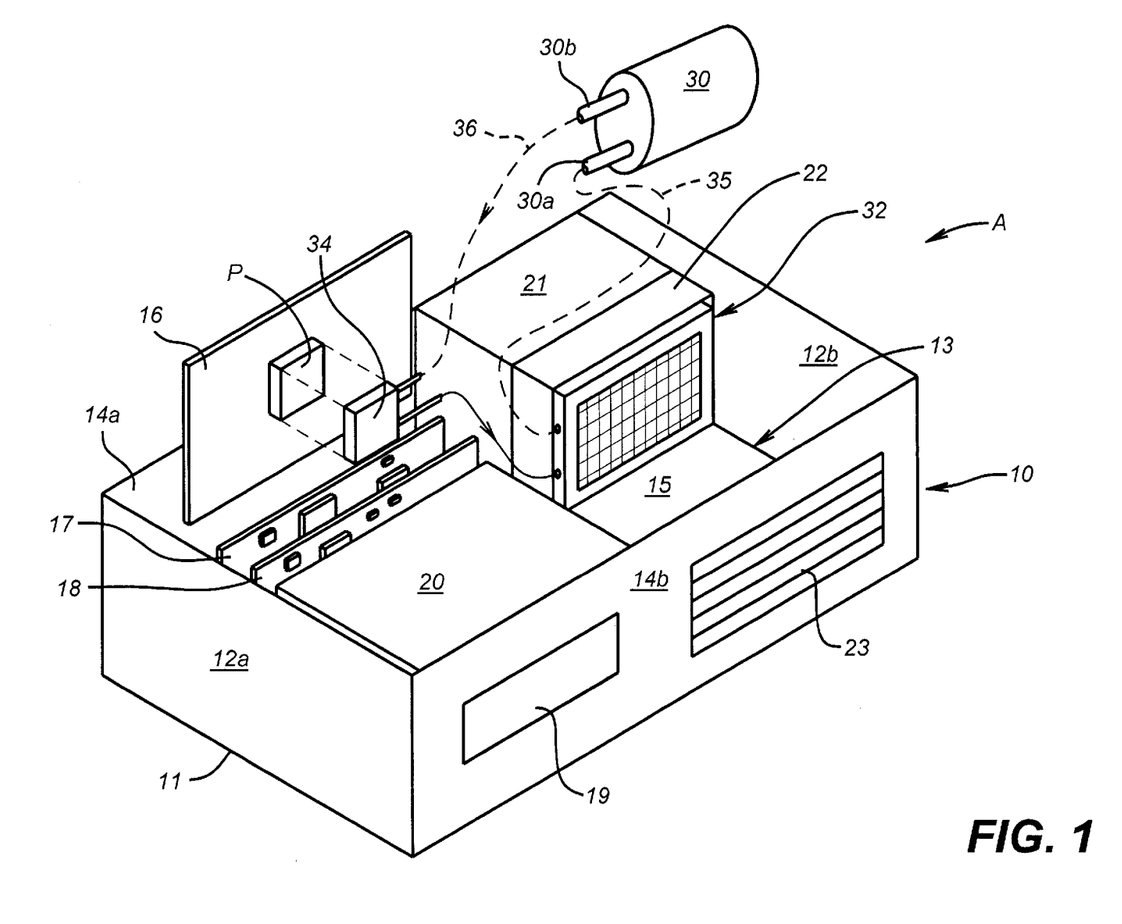
FIG. 1 is a schematic view of a computer illustrating the preferred embodiment of this invention for providing a liquid cooling medium to a high heat generating processor.
Figure 2:
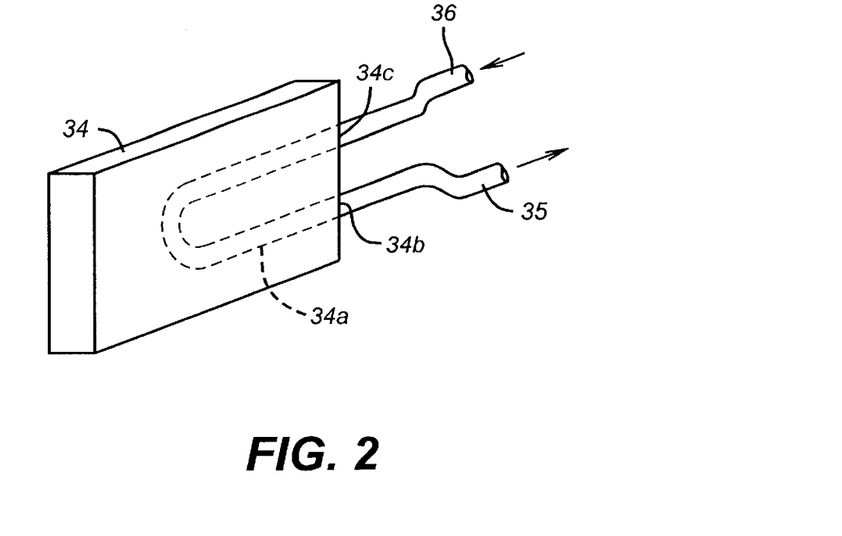
FIG. 2 is a schematic view illustrating a heat exchange plate for mounting onto a high heat generating processor.
Figure 3:
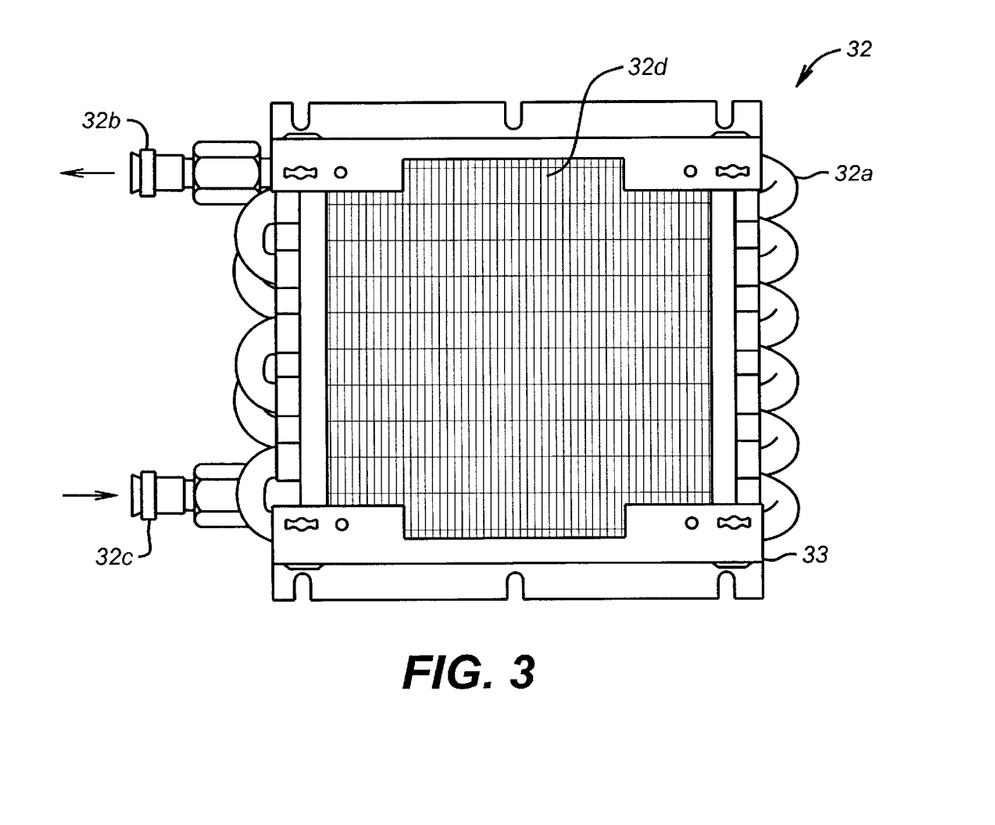
FIG. 3 is a side view illustrating an air to liquid heat exchanger for cooling liquid flowing from the heat exchange plate of FIG. 2.

Referring to the drawings and in particular to FIGS. 1–3, apparatus generally designated as A is illustrated for continuously cooling a high heat generating component P such as the Pentium® manufactured by Intel Corporation, which generates high heat due to its power requirements. When the Pentium® chip was first developed by Intel, Intel proposed that the Pentium® chip be cooled by a combination of a heat sink and air flow, with the size of the heat sink and the amount of air flow being interrelated. Public specifications for early versions of the Pentium® chip included maximum power for a 66 MHZ Pentium® processor of a PGA package type of 16W, having a package size of 2.16"×2.16" and a maximum case operating temperature of 70° C. Intel further disclosed as specifications that the maximum device junction temperature for such a Pentium® processor was 90° C.

Within a typical computer housing, it is known that ambient air should be in the range of 40° C. to 45° C., ambient air being defined as the temperature of the undistributed ambient air surrounding the Pentium® package. For Intel, ambient temperature was typically measured at 12 inches upstream from the package under investigation and in a system environment, ambient temperature was defined as the temperature of the air upstream to the package and in its close vicinity.

With the advent of newer generations of the Pentium® processor and other high operating temperature or high heat generating chips such as application specific integrated circuits (ASICS), which will be collectively referred to hereinafter as "high heat generating processors" or "high operating temperature chips," it is becoming increasingly difficult to maintain such operating processors within desired operating temperature limits utilizing only a combination of heat sinks or finned heat exchangers subjected to air flow. Apparatus A of this invention is directed to a cooling system utilizing liquid as a coolant for specifically-maintaining high operating temperature processors or chips within manufacturer's specified limits. Further, it is known that chip manufacturers typically reject or sell at reduced prices chips which exceed operating temperature specifications. Utilizing apparatus A of this invention may allow use of previously rejected chips which can be purchased at reduced rates.

Referring to FIG. 1, a computer housing generally designated as 10 is illustrated. The housing 10 is in a rectangular box form as is well-known in the prior art. The exemplary housing 10 includes a bottom 11, a first set of opposing sides 12a and 12b and a second set of opposing sides 14a and 14b, all of which are interconnected or formed integrally with the bottom 11. A chassis generally designated as 13 is mounted within the housing 10 in a known manner. The chassis 13 is generally rectangular so that the chassis has opposing sides (not shown, but parallel to and slightly smaller in dimension as the sides of the computer housing) to conform to the computer housing bottom 11 and sides 12a–b and 14a–b and includes mother board 15.

As is known in the art, the mother board 15 is positioned adjacent to bottom 11 of housing 10 to mount the various computer components which are utilized as known in the art. All the components necessary for a fully operating computer will not be described herein but are fully known to those of ordinary skill in the field of computer design. The components which will be specifically identified herein are those specifically relevant to this invention.

The mother board 15 includes a series of slot mountings (not shown but known in the art) which mount a series of "daughter" boards including boards such as microprocessor board 16 which actually mounts the Pentium® or other high heat generating processor. The advantage of mounting the principal high heat generating processor P onto a removable board 16 is that the computer may be enhanced by exchanging board 16 for a board containing a new and improved high heat generating chip. Other daughter boards such as a peripheral component interface board or a video interface board are mounted and identified as 17 and 18. It is also common to mount the processor chip in zero insertion force (ZIF) or low insertion force (LIF) sockets. Housing door or opening 19 mounts one or more bays for receiving floppy disk drives or compact disk drives as is known in the art. The rectangular structure generally designated at 20 is the mounting location for one or more such peripheral component units.

A power supply 21 is mounted in the corner of the housing formed by sides 14a and 12b such that no coolant leak could flow into the power supply primary side under any operating condition due to gravity or entrainment in the air flow. A computer cooling fan 22 is mounted adjacent to the power supply 21. A series of slots 23 are formed in the side or face 14b in order to allow for the in flow or out flow of air for circulation through the housing.

Apparatus A of this invention continuously provides liquid coolant to the high operating temperature chip P and includes a pump generally designated as 30, an air-side heat exchanger generally designated as 32 and a heat transfer plate 34. The pump 30, which may be mounted at any convenient location within the confines of the chassis 13, provides a closed loop liquid coolant circulation system for pumping coolant between the air-side heat exchanger 32 and the plate heat exchanger 34. The air side heat exchanger 32 is illustrated in detail in FIG. 3. The air side heat exchanger 32 can be any of a number of commercially available heat exchangers. In the current preferred embodiment heat exchanger 32 of FIG. 3 may be similar to a 720 series heat exchanger having a transfer capacity up to 18 kw sold by EG&G Division of Walefield Engineering of Wakefield, Mass. The series 720 heat exchanger 32 utilizes copper tubing 32a which extends from inlet 32c and is formed in a serpentine configuration which exits the unit at outlet 32b. A frame for mounting the serpentine configuration of the copper tubing 32a is generally rectangular in configuration and designated by the number 33, and is made of aluminum. The air side fins 32d are mounted within the aluminum frame 33 and attached to the serpentine configuration of copper tubing in a known manner. The unit comes with an available standard Rotron Muffin Fan tm XL Model No. MX2A3 or another fan unit 22 may be used as is known in the art. In any event, it is desirable to mount the air side heat exchanger 32 immediately adjacent to the fan unit 22 for greatest heat transfer efficiency to reduce the temperature of liquid coolant flowing therethrough. The pump 30 to be utilized should have a diameter of no greater than 2.5 inches and a length of no greater than 5.0 inches. The pump 30 should have a flammability rating of UL94 94V-2 and a UL motor overload and lock rotor rating of UL 1950. For purposes of definition, the pump 30 has low pressure entry port 30a and a high pressure exit port 30b.

The cooling plate 34 is illustrated schematically in FIG. 2. The cooling plate 34 is a rectangular, block of solid copper which receives a brass tubing line 35 at its outlet 34b and brass tubing line 36 at its inlet 34c. The brass tubing lines 35 and 36 are shown in dashed lines in FIG. 1 since the pump may be located at any available location within the confines of the chassis 13. The copper block 34 is shown to have a U-shaped bore portion generally designated as 34a drilled through the block or otherwise formed. However, other configurations for the flow, including a serpentine flow path having multiple bores extending in the long direction of the block may be utilized in order to effect greater heat transfer. The overall dimensions of the copper block in terms of length and width are to be designed to conform to the length and width of the alloy material bottom surface or ceramic undersurface of the Pentium® chip or other bottom surface of a high operating temperature chip. The topography of the block surface to be in contact with the bottom surface of a high heat generating chip can be machined to conform to the bottom surface of this chip with interstitial application of thermal grease or equivalent as known by the art to avoid air pockets. Rather than utilize a solid copper block, it is within the scope of this invention to utilize as a cooling plate 34 a hollow block having bottom, top and four sides formed of copper or brass with one or more internal baffles running lengthwise part of the length of the housing to partition the housing into multiple chambers for purposes of providing fluid communication with the inlet tube 36 and the outlet tube 35. The tubing should be brass or fire-resistant plastic and rated to required operating conditions, and should have a flammability rating of UL62 VW-1.

The liquid coolant may be water, or a mixture of 50 percent ethylene glycol and water with known corrosion inhibitors. The liquid system will utilize connectors known in the art to provide a closed coolant system which is sealed for life and is not field serviceable.

It is known that the electronic components mounted on the chassis typically raise the ambient temperature within the computer housing 10 about 10° C. It is further known that high heat generating chips such as the Pentium® have an operating temperature range of about 60–70° C. The apparatus A of this invention is designed to cool the chip P to an operating temperature within the range of about 55° C. in order to be able to use chips which currently are out of specification of certain chip manufacturers. This is accomplished by designing the size of the heat exchanger 32 and flow rate of the pump 30, taking into consideration the effective heat transfer of the cooling plate 34, such that sufficient heat will be transferred from the operating chip P to reduce the operating temperature to about 55° C. for worst case operating conditions, that is, to about 5° C. below the bottom of the temperature operating range of the chip. The 55° C. assumes a room ambient temperature of 40° C. The required flow rate will vary depending upon the particular processors, ASIC and/or hard drive cooled, but it is believed that the flow rate will be less than the prior art uses of liquid cooling.

Figure 4:
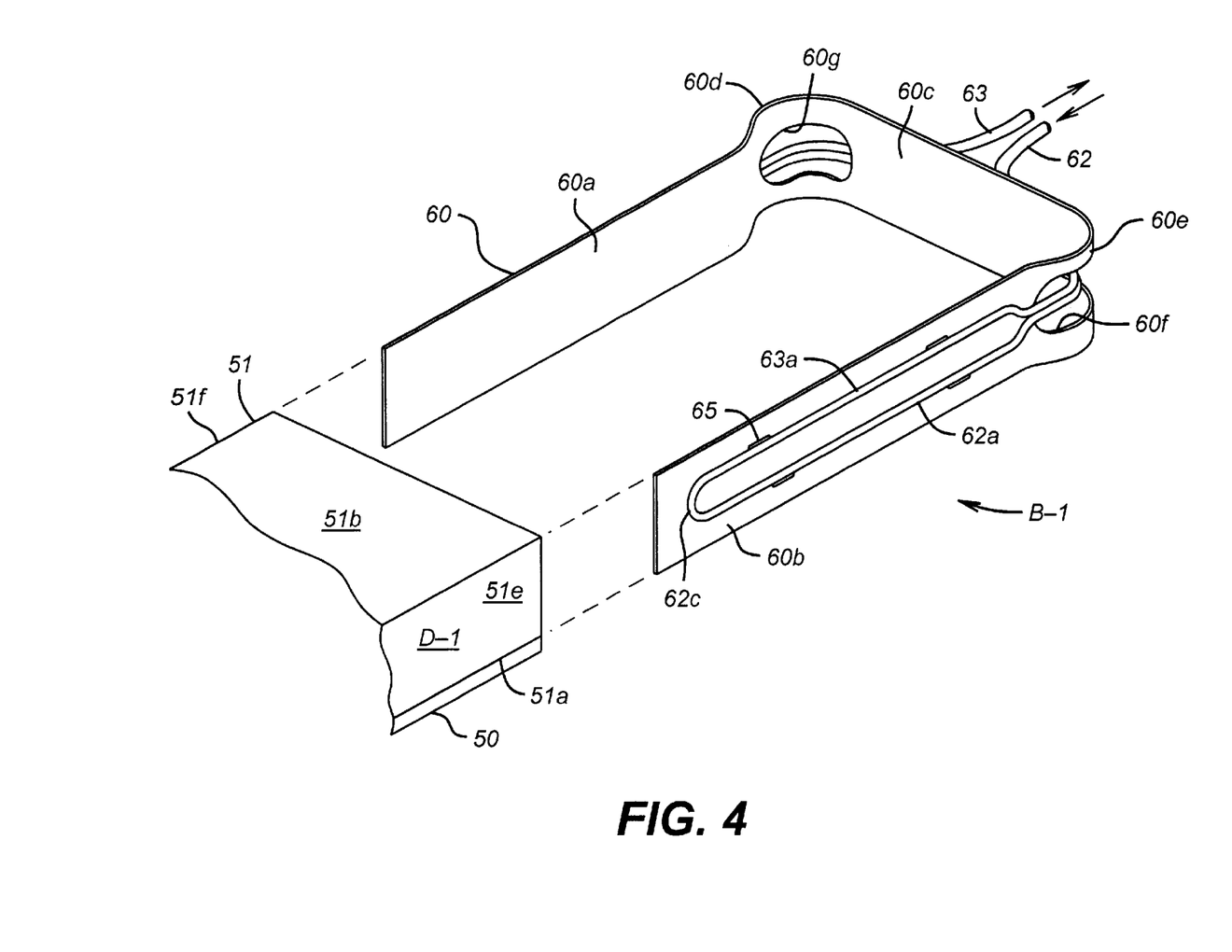
FIG. 4 is a perspective view of a clip-on heat exchanger for providing heat exchange liquid coolant to a hard disk drive.
Figure 5:
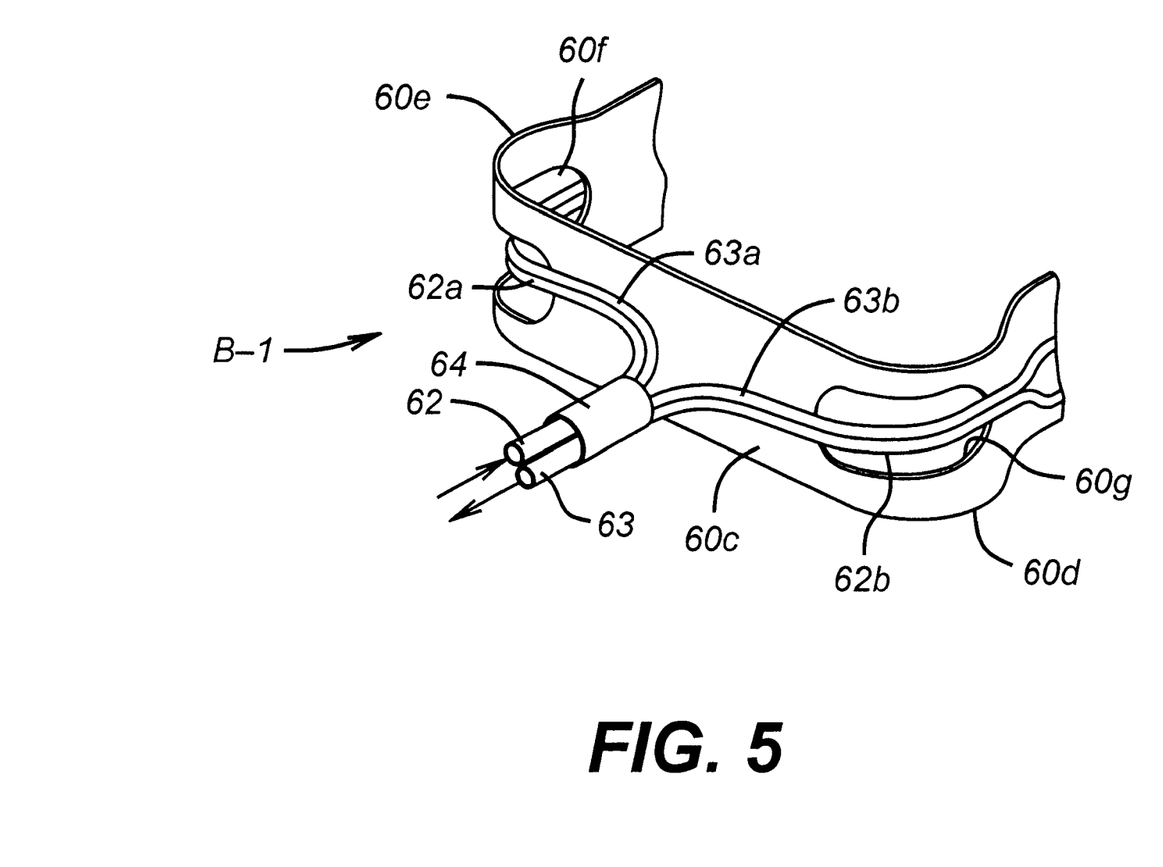
FIG. 5 is a perspective view of the rear side of the clip-on hard disk drive heat exchanger of FIG. 4.
Figure 6:
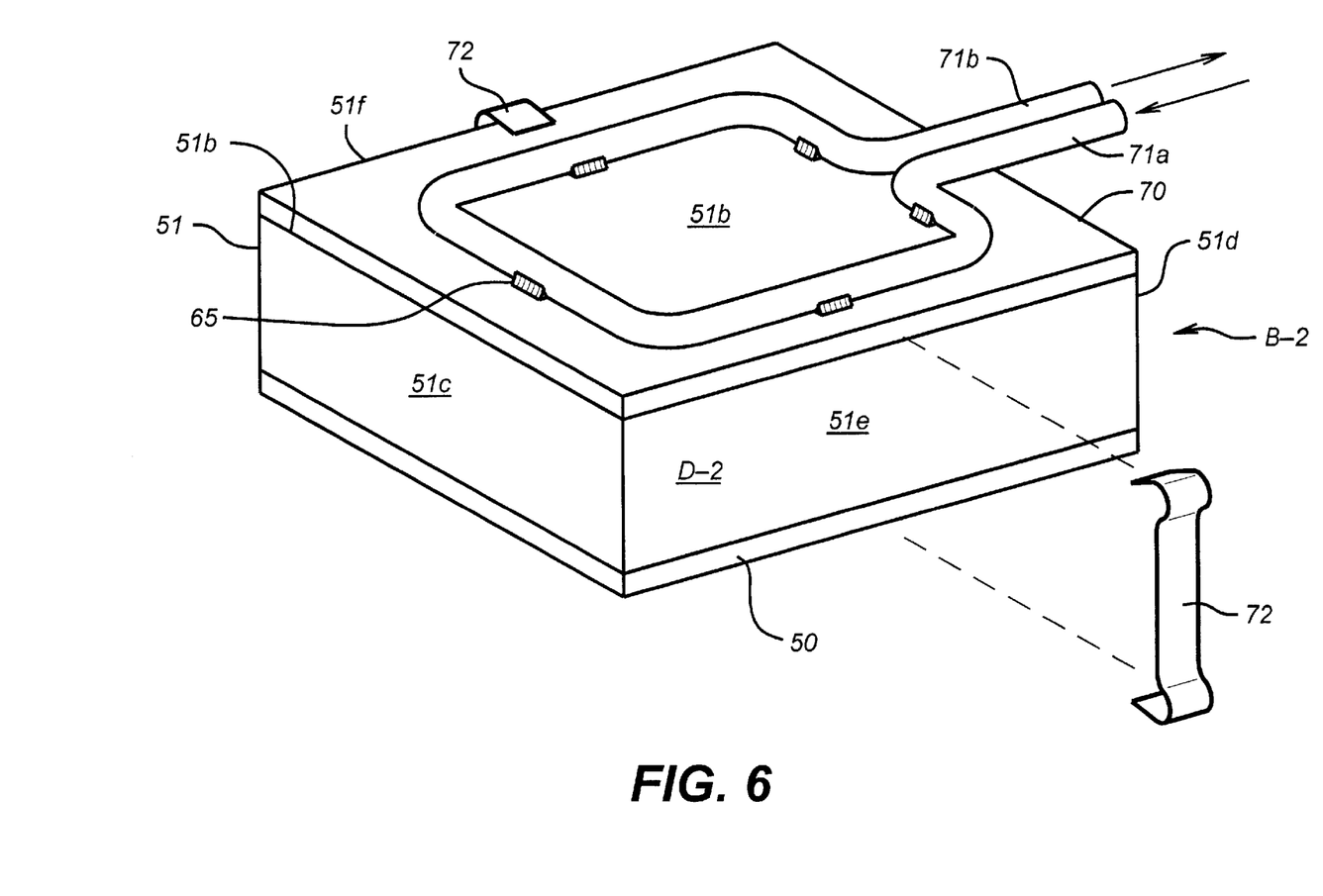
FIG. 6 is a perspective view of a heat transfer plate for mounting on the surface of a hard disk drive.

Referring to FIGS. 4–6, apparatuses B-1 and B-2 are illustrated and provided for providing liquid coolant for reducing the operating temperature of hard disk drives. The hard disk drives such as drive D-1 illustrated in FIG. 4 and drive D-2 illustrated in FIG. 6 have become commercially standard components in their mounting pattern and envelope. The drives D-1 and D-2 are mounted inside computer housings either alone or in densely stacked arrangements (to be discussed with respect to FIG. 7). Typically, the hard disk drives are cooled by air flow without heat sink provisions due to the type of packaging. Hard disk drives such as D-1 and D-2 come in two basic sizes, "half height" and "full height." The only difference is that the half height hard disk drive is approximately 1 inch high and the full height hard disk drive is approximately 1.63 inches high. Hard disk drive assemblies are basically built of a steel container with a single printed wiring board (PWB) such as designated as 50 in FIGS. 4 and 6 being screwed intimately to the bottom 51a of the hard disk drive housing generally designated as 51. The other surfaces of the hard disk drive housing 51 include top 51b, front and bad, sides 51c and 51d, respectively, and opposing sides 51e and 51f. As is well-known in the art, the hard disk drive container 51 contains a set of hard drive disks mounted on a spindle which rotates at many thousands of rpm. The rotating action results in malting the internal hard drive container environment into a uniform temperature or what may be termed a "well-stirred vessel." Hard disk drives such as D-1 and D-2 contain several temperature sensitive devices including but not limited to the motor bearings.

It is known to cool hard disk drives in part through conduction cooling through their mounting rails, a techniques which is limited in efficiency due to the interface conductance loss through the rails and loss due to conduction throughout the length of the rails.

Referring to FIG. 4, apparatus B-1 is a clip-on heat exchanger for resilient mounting onto opposing surfaces of a hard disk drive D-1 unit housing 51. The clip-on heat exchanger 60 is formed of a generally U-shaped spring clip 60 made of beryllium copper, phosphor bronze or other suitable metal. The U-shaped spring clip 60 is formed of first and second clip arms 60a and 60b which are integrally joined to the clip base or back 60c through two curved or arcuate integrally formed yieldable sections 60d and 60e. The U-shaped heat exchanger clip 60 is thus formed with sides 60a and 60b which are easily and resiliently expandable apart for insertion onto the sides 51e and 51f of the disk drive housing 51 and thereafter are held in place due to the resilient compressibility of the spring action of the clip itself.

Referring to FIGS. 4–5, the U-shaped spring clip includes openings 60f and 60g positioned in the arcuate sections 60d and 60f. Tubing inlet 62 and tubing flow outlet 63 are mounted with the heat exchange clip back 60c and sides 60a and 60b in order to cool the heat exchange clip itself and thereby through conduction absorb heat from the disk drive housing 51. Tubing inlet line 62 passes through a junction 64 having a Y-shaped connection (not shown) to divide the inlet line into first and second inlet line portions 62a and 62b. Tubing outlet line 63 is divided by a Y-shaped connection into tubing outlet line portions 63a and 63b. Inlet lines 62a and 62b extend through heat exchange clip openings 60f and 60g, respectively, and extend longitudinally along the length of each of the outer surfaces of sides 60b and 60a. The tubing portions 62a and 62b are attached to the sides 60a and 60b by brazing at points 65. The tubing inlet lines such as 62a makes U-turn at section 62c and joins return coolant line 63a, which extends back to coolant outlet line 63. The heat exchange dip coolant inlet line 62 extends to the pump outlet for a pump such as the pump 30 of FIG. 1, and the heat exchange clip coolant outlet line 63 extends to the inlet of the air side exchanger such as 32 so that the heat exchanger 32 in the pump 30 is part of the overall hard drive coolant system of FIGS. 4–5 for continuously removing heat from the operating hard disk drive.

Referring now to FIG. 6, a hard disk drive D-2 is illustrated. Drive D-2 has a housing identical to housing 51 of drive D-1 except that drive D-2 is attached on one or more of its sides such as 51e to mountings within the computer housing such that it is necessary to provide apparatus B-2 to provide cooling to the hard disk drive. Apparatus B-2 includes a copper plate 70 which is rectangular in configuration and has a length and width which matches the top surface 51b of hard drive D-2. Coolant inlet line portion 71a extends from an outlet line from the pump 30 (FIG. 1) other suitable pump and is mounted onto the top of the cooling plate 70 by brazing at various points 65 as shown in FIG. 6 and extends in a generally rectangular pattern around the perimeter of the cooling plate 70 and terminates in an outlet portion generally designated 71b integrally formed with the inlet portion, such outlet portion 71b extending to an inlet to the air side heat exchanger 32 or other suitable air side heat exchanger, so that the pump 30 and air side heat exchanger of FIG. 1 form part of the heat exchange system B-2 of FIG. 6. One or more retainer clips generally designated as 72 are mounted on one or more sides such as 51c, 51e and/or 51f of the hard disk drive D-2 in order to retain the cold or cooling plate 70 in position on the top surface 51b of the disk drive housing 51.

Figure 7:
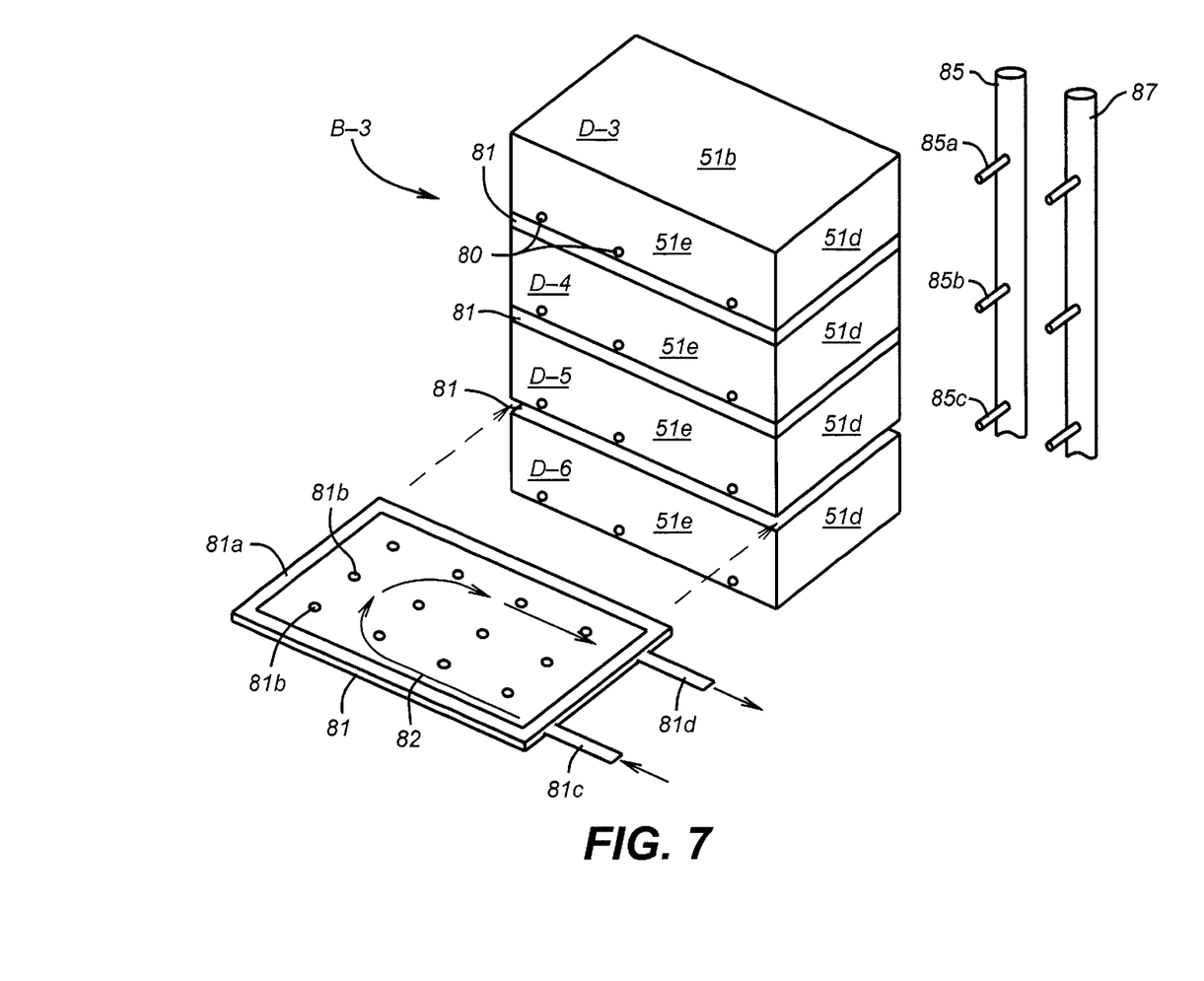
FIG. 7 is a perspective view of the use of heat exchange panels for insertion between adjacent, vertically stacked hard disk drive units.

Referring to FIG. 7, apparatus B-3 is provided for cooling vertical array of hard disk drives D-3, D-4, D-5 and D-6, which are vertically stacked upon each other and mounted to suitable computer mountings by screw holes 80 such as well known rail-type mountings (not shown). The vertical array of hard disk drives D-3 through D-6 will generate substantial heat which cannot be suitably cooled to desired operating temperatures through the use of conventional heat sinks and air cooling. Each of the hard disk drives D-3 through D-6 include a generally rectangular, box-like housing or container having a top surface, a bottom surface and opposing sides surfaces and thus the same designation for each housing for each of the containers for drive units D-3 through D-6 may be used. Air cooling is undesirable as a technique due to the high volumes of air necessary to cool, which would require undesirable reliability risk due to possible fan failure and which will cause acoustical problems, also. The cooling system B-3 is provided for interposition or sandwiching between adjoining hard disk drives such as D-3 and D-4 for providing for conductive heat transfer of heat from adjacent disk drives to a series of flexible heat exchange structures or panels 81.

Each of the flexible heat exchange structures 81 is made of a hollow, relatively thin, sheet-like panel in rectangular form and is filled with a coolant liquid such as a mixture of 50% water and 50% ethylene glycol. The flexible heat exchange structure 81 has a peripheral seal section 81a which extends about the rectangular periphery to form a cavity or chamber therein. The interior of the flexible heat exchange structure is formed of five flexible body layers which include, from top to bottom, a top layer, a middle layer and a bottom layer of a polyamide film material, representatively a material manufactured by the Dupont Company under the name "KAPTON," with intervening layers of an FEP fluorocarbon film material, representatively a material manufactured by the Dupont Company under the tradename "TEFLON." Passages are provided through the central area between the two sheets of fluorocarbon film material by providing round interbonded sections 81b at spaced locations in order to provide a generally U-shaped flow path 82 through the flexible heat exchange panel or structure 81. The points of film attachment 81b also serve to hold the outer sheets against undesirable expansion or ballooning, which may provide undesired forces against the printed wiring board 50 side of the drives. Instead, the force can be controlled to provide only beneficial heat transfer pressure to enhance the heat transfer contact with the surface of the hard disk drives. The location of the round interbonded sections may be varied in order to provide different flow paths but in the embodiment illustrated, the interbonded sections 81b are located at four points in a line along three lines running a longitudinal direction of the pad 81.

For further description of the manufacture of such a flexible heat exchange panel, Applicant incorporates by reference U.S. application Ser. No. 08/674,081 listing as inventors Messrs. Daniel N. Donahoe and Michael T. Gill, which patent application was filed on Jul. 17, 1996 and assigned to the same assignee as herein, Compaq Computer Corporation. While the entire disclosure, specification, claims and drawings are incorporated herein by reference for purposes of enabling description and for support for claiming, Applicant specifically directs attention to the disclosure relating to FIGS. 3–7, and to the description of the cross-sectional flow passages found on pages 9–12, and referring in particular to FIGS. 3 and 4. It is also feasible to use a more simplified panel structure having two adjoining layers of suitable flexible plastic material sealed at their periphery and having multiple points where the sheets are heat welded together internally of the sealed rim.

Each of the flexible heat exchange panels 81 includes a coolant entrance or inlet 81c and a coolant outlet 81d. With the panels 81 positioned or sandwiched between adjacently stacked hard disk drives such as D-3 and D-4, the coolant flow outlets 81d of each panel 81 are connected to a central return manifold 85 through connections 85a, 85b and 85c. A similar inlet manifold 87 connects together the inlets 81c for each of the interposed or sandwiched flexible cooling panels 81. The inlet manifold 87 is then attached to the outlet to a suitable pump such as the pump 30 of FIG. 1. The outlet manifold 85 is suitably connected to the inlet of an air side heat exchanger such as the air side heat exchanger 32 disclosed in FIGS. 1 and 3.

The expansion of the panels during operation, as the result of fluid pressure, has another beneficial feature, which is that the drives are held more tightly in position during operation; and, when the panels are deflated, the drives are more easily removed.

The foregoing disclosure and description of the invention are illustrative and explanatory thereof, and various changes in the details of the illustrated apparatus and construction and method of operation may be made without departing from the spirit, of the invention. For example, it is within the scope of this invention to combine the various heat transfer embodiments of this invention for use within a single computer. Apparatus A of FIGS. 1–3 can be used to cool multiple chips by properly sizing the pump 30, fan 22 and the air side heat exchanger 32 to provide suitable cooled liquid coolant to more than one heat transfer plate 34 simultaneously. Further, the pump 30, fan 22 and air side heat exchanger 32 may be suitably sized to cool the hard disk drive housing 51 using the U-shaped dip 60 of apparatus B-1 of FIGS. 4–5 or using the heat transfer plate 70 of apparatus B-2 of FIG. 6 in conjunction with the system of FIGS. 1–3. Or, the system B-3 for cooling the vertical array of disk drives D-3 through D-6 of FIG. 7 can be combined with the cooling system A of FIG. 1–3. Further, disk cooling apparatus B-1 and B-2 can be used with the air side heat exchanger 32 and pump 30 of FIGS. 1–2. Or, any other combination of any of A, B-1, B-2 and/or B-3 can be used with a single pump, air side heat exchange assembly.

What is claimed is:

1. Electronic apparatus, comprising:
    a generally rectangular chassis having first and second sets of opposing sides;
    a plurality of electronic components mounted on said chassis, including a hard disk drive, said hard disk drive having a generally rectangular box-like container;
    a heat exchange system for said hard disk drive, including;
    a generally U-shaped heat exchange clip including first and second arms integrally formed with a base;
    a coolant loop mounted with said U-shaped heat exchange clip, said coolant loop including a first loop section attached to said first arm of said heat exchange clip and a second loop section attached to said second arm of said heat exchange clip for circulating liquid coolant to absorb heat transferred from said hard disk drive container to said first and second arms of said heat exchange clip;
    said arms of said U-shaped clip being resiliently formed with said base for insertion over said hard disk drive container in resilient engagement therewith; and
    a closed circulation system for circulating liquid coolant to said cooling loop mounted on said U-shaped clip and reducing the temperature of said coolant circulating from said cooling loop before circulating said coolant to said cooling loop,
    each of said first and second arms of said U-shaped clip has an opening therein, said first loop section and said second loop section extending through said openings in said first arm and said second arm for attachment to the outside surface of each arm.

2. Electronic apparatus of claim 1, wherein the U-shape heat exchange clip comprises beryllium copper, phosphor bronze, or other suitable metal.

3. Electronic apparatus of claim 1, wherein the openings are positioned in arcuate sections of the clip.

4. Electronic apparatus of claim 1, wherein the coolant loop comprises a tubing inlet and a tubing outlet mounted with a heat exchange clip base and sides.

5. Electronic apparatus of claim 1, wherein heat is absorbed through conduction of thermal energy from the hard disk drive container.

6. Electronic apparatus of claim 1, wherein the coolant loop is adapted to cool the clip.

7. Electronic apparatus of claim 1, wherein the coolant loop is provided with inlet tubing divided into first and second inlet line portions.

8. Electronic apparatus of claim 1, wherein the coolant loop is provided with outlet tubing divided into first and second outlet line portions.

9. Electronic apparatus of claim 1, wherein the coolant loop is provided with inlet lines that extend through openings in the heat exchange clip, and extend longitudinally along the length of the arms.

10. Electronic apparatus of claim 1, wherein the coolant loops are provided with tubing portions attached to the arms by braising.

11. Electronic apparatus of claim 1, wherein the coolant loop is provided with a tubing inlet line that comprises a u-turn and joins a return coolant line that extends back to a coolant outlet line.

12. Electronic apparatus of claim 1, wherein the heat exchange clip is provided with a coolant inlet line that extends to a pump outlet.

13. Electronic apparatus of claim 1, wherein the heat exchange clip is provided with a coolant outlet line that extends to the inlet of an air side exchanger.

14. Electronic apparatus of claim 13, wherein the heat exchanger is in a pump and is part of the overall hard drive system adapted to continuously remove heat from the hard disk drive when operating.

15. Electronic apparatus, comprising:
    a generally rectangular chassis having first and second sets of opposing sides;
    a plurality of electronic components mounted on said chassis, including a hard disk drive, said hard disk drive having a generally rectangular box-like container;
    a heat exchange system for said hard disk drive, including:
    a generally U-shaped heat exchange clip including first and second arms integrally formed with a base;
    a coolant loop mounted with said U-shaped heat exchange clip, said coolant loop including a first loop section attached to said first arm of said heat exchange clip and a second loop section attached to said second arm of said heat exchange clip for circulating liquid coolant to absorb heat transferred from said hard disk drive container to said first and second arms of said heat exchange clip;
    said arms of said U-shaped clip being resiliently formed with said base for insertion over said hard disk drive container in resilient engagement therewith; and
    a closed circulation system for circulating liquid coolant to said cooling loop mounted on said U-shaped clip and reducing the temperature of said coolant circulating from said cooling loop before circulating said coolant to said cooling loop,
    each of said first and second arms of said U-shaped clip has an opening therein, said first loop section and said second loop section extending across said openings in said first arm and said second arm for attachment to the outside surface of each arm.

16. Electronic apparatus of claim 15, wherein the U-shape heat exchange clip comprises beryllium copper, phosphor bronze, or other suitable metal.

17. Electronic apparatus of claim 15, wherein the arms of the U-shaped clip are integrally joined to the clip base or back through 2 curved or arcuate intricately formed yieldable sections.

18. Electronic apparatus of claim 15, wherein the arms are easily and resiliently expendable apart for insertion over the hard disk drive container.

19. Electronic apparatus of claim 15, wherein the arms are held in place due to resilient compressibility of spring action of the clip.

20. Electronic apparatus of claim 15, wherein the openings are positioned in arcuate sections of the clip.

21. Electronic apparatus of claim 15, wherein the coolant loop comprises a tubing inlet and a tubing outlet mounted with a heat exchange clip base and sides.

22. Electronic apparatus of claim 15, wherein heat is absorbed through conduction of thermal energy from the hard disk drive container.

23. Electronic apparatus of claim 15, wherein the coolant loop is adapted to cool the clip.

24. Electronic apparatus of claim 15, wherein the coolant loop is provided with inlet tubing divided into first and second inlet line portions.

25. Electronic apparatus of claim 15, wherein the coolant loop is provided with outlet tubing divided into first and second outlet line portions.

26. Electronic apparatus of claim 15, wherein the coolant loop is provided with inlet lines that extend across the openings in the heat exchange clip, and extend longitudinally along the length of the arms.

27. Electronic apparatus of claim 15, wherein the coolant loops are provided with tubing portions attached to the arms by braising.

28. Electronic apparatus of claim 15, wherein the coolant loop is provided with the tubing inlet line that comprises a u-turn and joins a return coolant line that extends back to a coolant outlet line.

29. Electronic apparatus of claim 15, wherein the heat exchange clip is provided with a coolant inlet line that extends to a pump outlet.

30. Electronic apparatus of claim 15, wherein the heat exchange clip is provided with a coolant outlet line that extends to the inlet of an air side exchanger.

31. Electronic apparatus of claim 15, wherein the heat exchange system comprises a pump and is part of the overall hard drive system adapted to continuously remove heat from the hard disk drive when operating.

* * * * *